UNITED STATES PATENT OFFICE.

ALBERT SMITH, OF MIDDLEVILLE, MICHIGAN, AND POLLY A. ZELIE, OF DUNDEE, NEW YORK.

COMPOSITION FOR GRAINING WOOD.

SPECIFICATION forming part of Letters Patent No. 328,073, dated October 13, 1885.

Application filed April 9, 1884. Serial No. 127,225. (Specimens.)

*To all whom it may concern:*

Be it known that we, ALBERT SMITH and POLLY A. ZELIE, citizens of the United States, residing, respectively, at Middleville, in the county of Barry and State of Michigan, and at Dundee, in the county of Yates and State of New York, have invented a new and useful Composition of Matter to be Used for Graining, of which the following is a specification.

The composition consists of the following ingredients, combined in the proportions stated, viz: Beer, one pint; alcohol, one ounce; benzoin, one ounce; muriatic or tartaric acid, one-fourth ounce; turpentine, one-half ounce. These ingredients are to be thoroughly mingled by agitation.

In using the above-named composition the surface to be grained should be painted or primed in the usual manner to form the ground of any desired color. Then in applying the composition, use a sponge, which, in the hand of any ordinary workman, will produce a like imitation to the natural grain of different kinds of wood. The imitation of a knot or other design can be produced after applying the mixture by rolling out and laying on putty, then flattening or shaping the same by the hand on removal of the putty, which can be used over and over again. It will be found a singularly beautiful effect has been produced.

The same can be used on plaster, and is not sticky to hinder in its use. We are not aware that all of the ingredients of our composition, in the proportions stated, have ever been used; therefore

What we claim, and wish to secure by Letters Patent, is—

The herein-described composition of matter to be used for surface-graining, consisting of beer, alcohol, benzoin, acid, and turpentine, in the proportions specified.

ALBERT SMITH.
POLLY A. ZELIE.

Witnesses:
CHARLES S. HOUGH,
EMMET HORTON.